(12) United States Patent
Frasier

(10) Patent No.: US 7,263,937 B2
(45) Date of Patent: Sep. 4, 2007

(54) SEED TUBE GUARD

(75) Inventor: Michael Eugene Frasier, East Moline, IL (US)

(73) Assignee: Deere & Company, Moline, IL (US)

(*) Notice: Subject to any disclaimer, the term of this patent is extended or adjusted under 35 U.S.C. 154(b) by 14 days.

(21) Appl. No.: 10/769,474

(22) Filed: Jan. 31, 2004

(65) Prior Publication Data

US 2005/0166813 A1  Aug. 4, 2005

(51) Int. Cl.
*A01B 49/04* (2006.01)
*A01C 5/00* (2006.01)

(52) U.S. Cl. .................. 111/140; 111/150; 111/154; 111/164

(58) Field of Classification Search .......... 111/140, 111/149, 150, 154, 157, 163, 164
See application file for complete search history.

(56) References Cited

U.S. PATENT DOCUMENTS

| | | | |
|---|---|---|---|
| 4,388,878 A | 6/1983 | Demzin | |
| 4,520,742 A | 6/1985 | Anderson | |
| 4,760,806 A | 8/1988 | Bigbee et al. | |
| 4,915,258 A | 4/1990 | Olson | |
| 5,033,398 A * | 7/1991 | Froc ............ | 111/152 |
| 5,092,255 A | 3/1992 | Long et al. | |
| 5,271,343 A * | 12/1993 | House ........... | 111/186 |
| 5,325,799 A * | 7/1994 | Rowlett ........ | 111/152 |
| 5,533,458 A | 7/1996 | Bergland et al. | |
| 5,562,055 A * | 10/1996 | Petersen ....... | 111/195 |
| 5,664,507 A | 9/1997 | Bergland et al. | |
| 5,724,903 A | 3/1998 | Yoder et al. | |
| 5,826,524 A | 10/1998 | Yoder | |
| 5,931,105 A | 8/1999 | Luxon | |
| 6,038,990 A * | 3/2000 | Simpson ........ | 111/124 |
| 6,059,047 A * | 5/2000 | Schimke ........ | 172/769 |
| 6,178,901 B1 * | 1/2001 | Anderson ...... | 111/197 |
| 6,209,466 B1 * | 4/2001 | Wodrich ....... | 111/189 |
| 6,585,058 B2 * | 7/2003 | Zaun et al. .... | 172/762 |
| 6,684,963 B1 * | 2/2004 | Poutre et al. .. | 172/750 |
| 6,814,151 B1 * | 11/2004 | Peck et al. .... | 172/750 |
| 2002/0166486 A1 | 11/2002 | Prairie et al. | |

* cited by examiner

*Primary Examiner*—Christopher J. Novosad
(74) *Attorney, Agent, or Firm*—The Law Office of Randall T. Erickson, PC

(57) ABSTRACT

A mutually-engageable or interlocking connection between a seed tube guard and a frame member mounted to a seed planting machine. The mutually-engageable connection includes a yoke having a front journal and a rear journal with a gap, the yoke, carried on the frame member, and a pin connected to a neck, carried by the guard. The pin is sized to fit between and into the front and rear journals, wherein the neck has a thickness less than a width of the gap in order to slide though the gap during installation, and a length to fit between and through the front and rear journals.

20 Claims, 5 Drawing Sheets

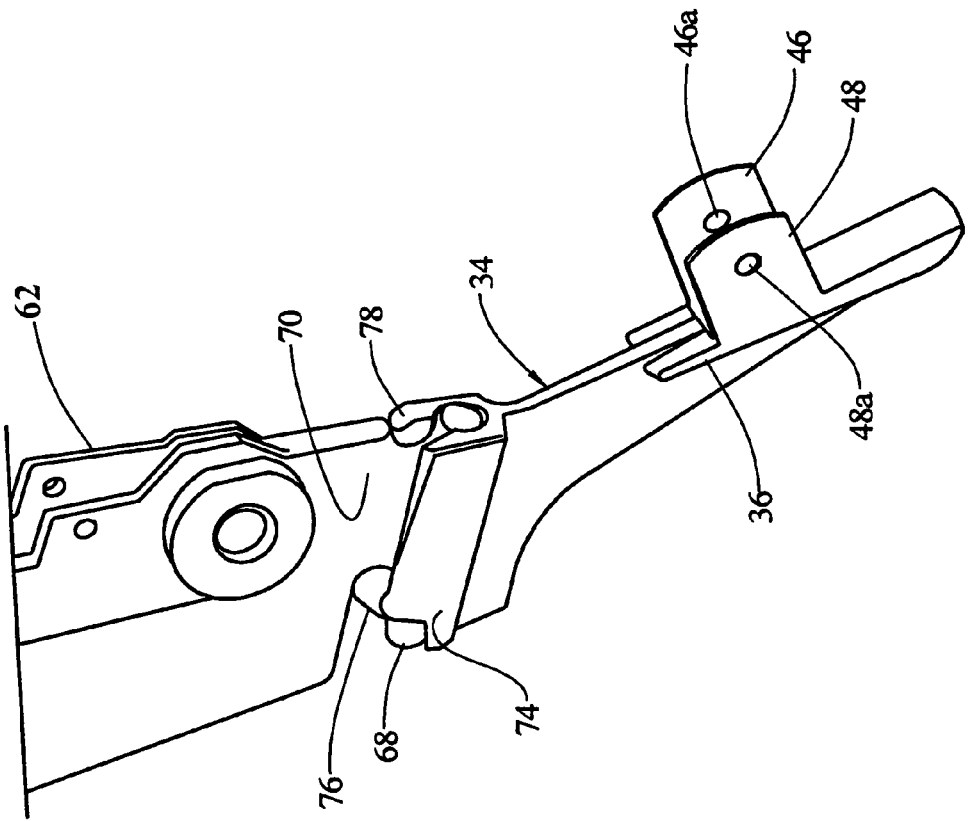
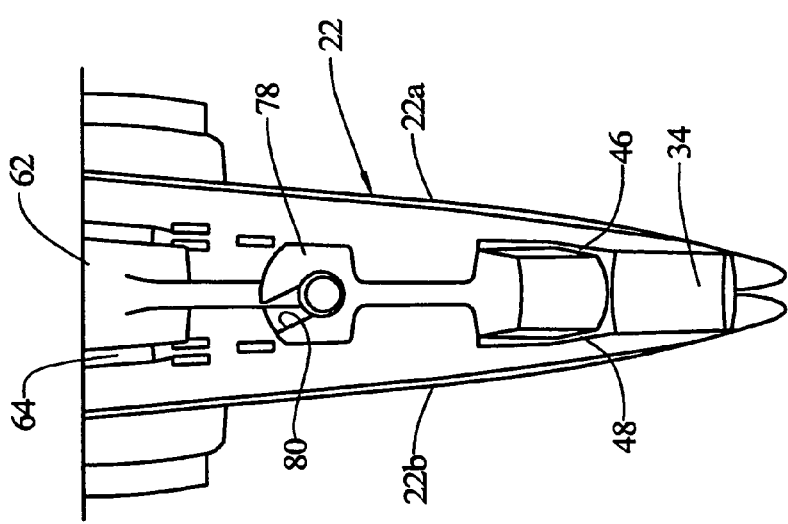

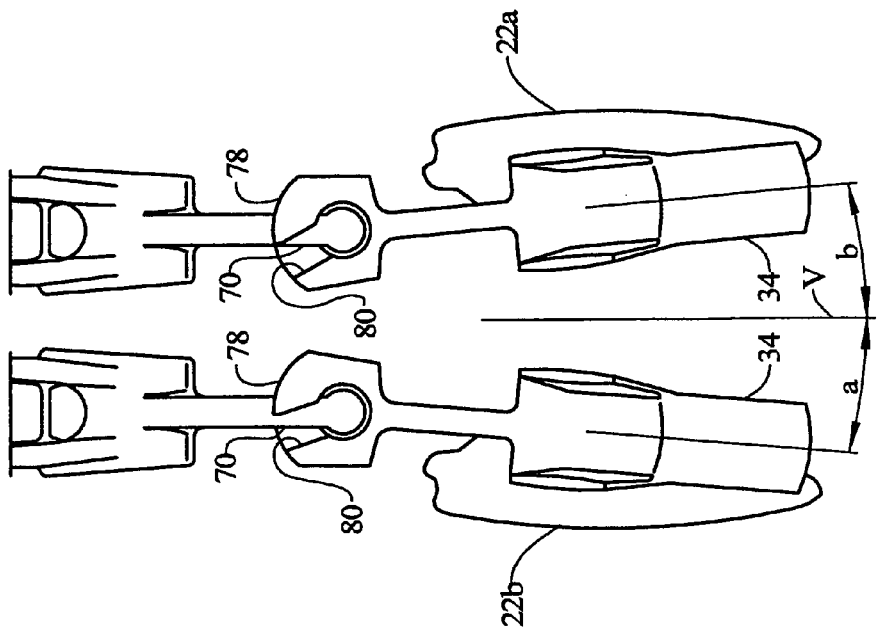
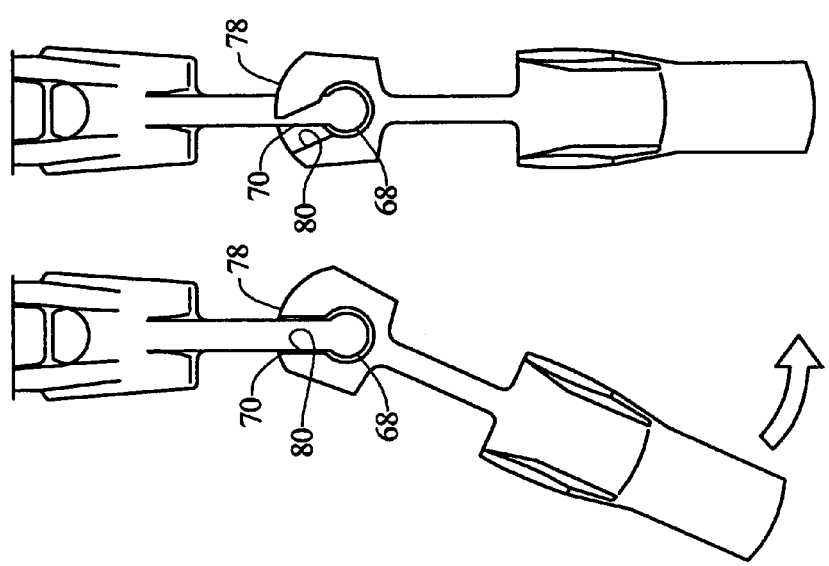

SEED TUBE GUARD

FIELD OF THE INVENTION

The invention is directed to a seed tube guard that is used to retain the seed tube centered in the seed planting furrow.

DESCRIPTION OF THE PRIOR ART

Row crop planters generally comprise a transverse toolbar having a series of rearward extending planting units. These units have a frame to which is mounted a furrow opener for forming a seed planting furrow in the seed bed. The furrow opener maybe provided with depth control wheels for controlling the depth of the furrow. A seed hopper may be mounted to the frame to direct seed to a seed meter. The seed meter dispenses the seed and directs the seed through a seed tube to the seed planting furrow formed by the furrow opener. Following the seed tube and the furrow opener are closing wheels.

In one planter currently on the market, the furrow opener comprises a double disc assembly. The seed tube is positioned between the double discs. A seed tube guard comprising a metal member is positioned in front of the seed tube again between the double discs of the furrow opener. Seed tubes are typically made of plastic. If not properly restricted by the tube guard, a seed tube may become displaced laterally and wear against the rotating disc blades. The blades may eventually wear a hole in the seed tube.

U.S. Pat. No. 5,664,507 discloses a plastic seed tube guide for maintaining the seed tube in the center of the seed planting furrow between the double disc openers. The seed tube guide comprises a unitary member having left and right forwardly extending mounting plates for engaging a seed tube guard. Each of the mounting plates has a notch for receiving the transversely extending ridge of the seed tube guard. Extending rearward are left and right guide members for gripping the seed tube and centering it in the seed planting furrow. The seed tube guard is connected to a planter frame member with roll pins. These guards can be difficult to install and service. Other styles of seed tube guards are rigidly attached with screws which do not allow lateral float of the guide.

The present inventor has recognized the need for a seed tube guard that is economically manufactured, and more easily installed and serviced, while maintaining necessary operating characteristics such as lateral float.

SUMMARY OF THE INVENTION

The invention provides, in combination, a seed tube guard for leading a seed tube through a furrow, and a mount or frame member mountable to a seed planting machine. The invention provides for the simple attachment of the seed tube guard to the frame member by an easily engaged connection. Preferably, the connection can be accomplished without the use of fasteners, or additional fastening parts, or tools.

The seed tube guard includes a body for fronting or protecting a seed tube, a first connection configuration for mounting the guard to the frame member, and an engagement portion for holding the seed tube behind the body. The frame includes a second connection configuration, wherein the first and second connection configurations are mutually engageable.

According to the preferred embodiment one of the first and second connection configurations comprises a yoke having a front journal and a rear journal. The front journal comprises a first circular opening, and the rear journal comprises a second circular opening with a gap. The gap is angled to the vertical. The respective other of the first and second connection configurations comprises a pin connected by a neck. The pin is sized to fit between and into the first and second circular openings, wherein the neck has a thickness less than a width of the gap in order to slide though the gap during installation, and a length to fit between and through the front and rear journals.

Preferably, the first connection configuration comprises the yoke and the second connection configuration comprises the pin and the neck.

The angle of the gap is set to be greater than the free swinging movement of the guard, the free swinging movement limited by interference with structures of the seed planting machine.

Preferably, the guard is composed of steel and the frame member is composed of iron. According to the preferred embodiment of the invention, the seed tube guard can be a through-hardened steel investment casting and the frame member can be a ductile iron part.

The present invention eliminates the need for attaching hardware by using the seed opener discs for retention of the seed tube guard. When fully installed, the opener discs are assembled adjacent opposite lateral sides of the guard and act to retain the guard in combination with the mutually-engageable connection. The seed tube guard can be installed without tools or fasteners. The seed tube guard installation arrangement provides the necessary amount of float within the seed furrow.

Numerous other advantages and features of the present invention will be become readily apparent from the following detailed description of the invention and the embodiments thereof, from the claims and from the accompanying drawings.

BRIEF DESCRIPTION OF THE DRAWINGS

FIG. 3 is a fragmentary, rear view of the seed tube guard shown in FIG. 2;

FIG. 4 is a fragmentary, rear perspective view of the seed tube guard shown in FIG. 2;

FIG. 7 is a fragmentary, rear view of the seed tube guard shown in FIG. 5;

FIG. 8 is a fragmentary, rear view of the seed tube guard shown in FIG. 6; and FIG. 9 is a fragmentary, diagrammatic view of the seed tube guard shown in FIG. 8, demonstrating the lateral range of swinging movement during operation.

DETAILED DESCRIPTION OF THE PREFERRED EMBODIMENTS

Figure 1:
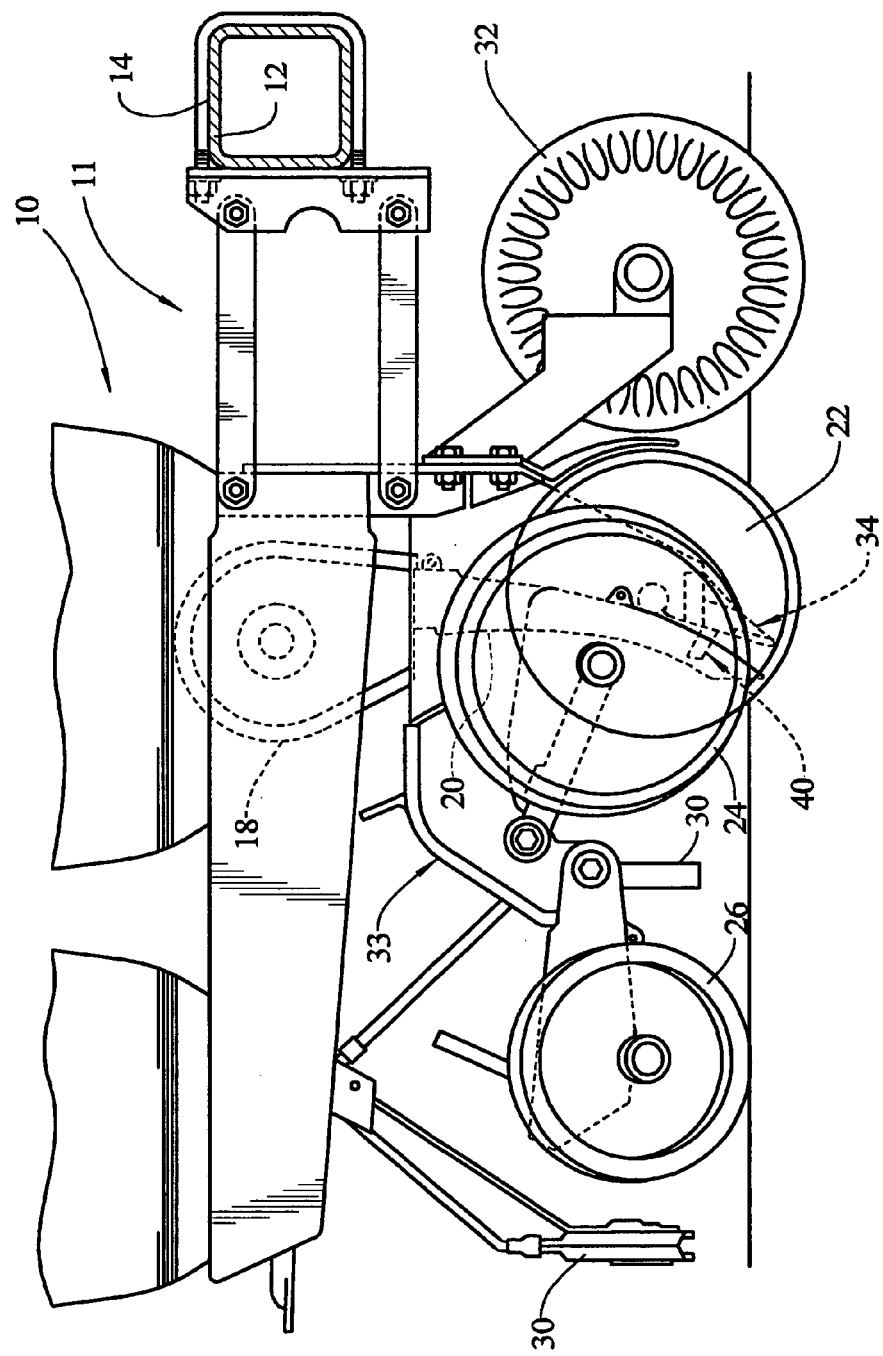
FIG. 1 is a right side view of a row crop planter unit.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 discloses an agricultural planting unit 10. The planting unit is provided with a parallel linkage 11 that is mounted to a transverse toolbar 12 by U-bolt 14 in a conventional manner. The planting unit is provided with a seed bin 16 which directs seeds to a seed meter 18. The seed meter 18 directs the measured seeds to a seed tube 20 for placing the seeds in a seed planting furrow. The seed planting furrow is formed by a furrow opener 22. Gauge wheels 24 control the depth of the furrow opener 22. A pair of seed firming wheels 26 close the trench after the seed has been deposited into the trench by the seed tube 20. The illustrated planting unit is also provided with a pesticide bin 28 for directing pesticides to the ground by applicators 30. A suitable pesticide meter (not shown) controls the application of the pesticide. In addition, a bubble coulter 32 is positioned forward of the furrow opener 22 to aid in opening the seed planting furrow. All of these elements are mounted to a planter unit frame 33.

The above disclosed planter is of a relatively conventional configuration. Typically, a plurality of planting units are mounted on toolbar 12 so that a farmer can plant more than one row in a single pass over the field. Although the present invention as illustrated as being mounted to a row crop planting unit 10, it can also be mounted to other seeding equipment like grain drills, and as such, the invention should not be limited to row crop planters.

The planter unit frame is provided with a downwardly depending seed tube guard 34. This guard 34 is positioned immediately in front of the seed tube 20 for protecting the seed tube from forward contact with the seed planting furrow. The guard 34 is provided with a transversely extending ridge 36.

The guard 34 includes a guide portion 40 having left and right guide members 46, 48 that cradle the plastic seed tube on the seed planting furrow centerline. This ensures better seed spacing and prevents seed tube wear from the disc blades. Although the illustrated embodiment shows the guide portion 40 to be a unitary part of the guard 34, a separate guide part can be utilized such as disclosed in U.S. Pat. No. 5,664,507, herein incorporated by reference.

The guide members 46, 48 can be provided with holes 46a, 48a which can be used for retaining the seed tube by a cross member, such as described n U.S. Pat. Nos. 5,826,524; 5,826,524; 5,724,903; 5,092,255 or 6,209,466, herein incorporated by reference, or to engage buttons or protrusions on the seed tube.

Figure 2:
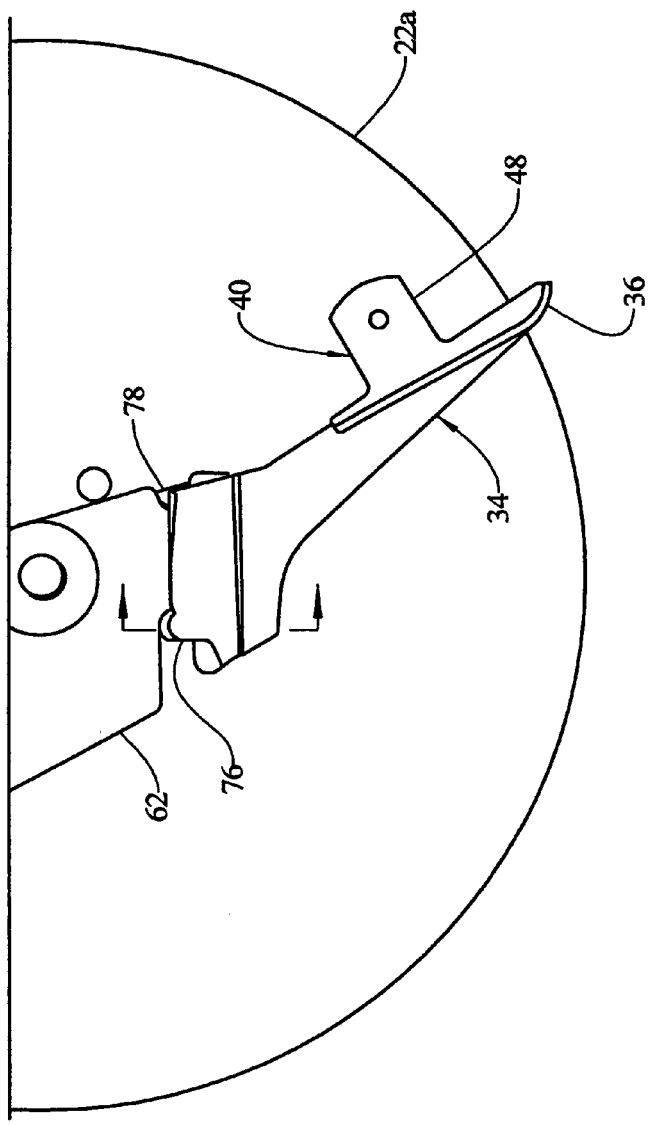
FIG. 2 is a fragmentary, enlarged left side view of the seed tube guard.
Figure 5:
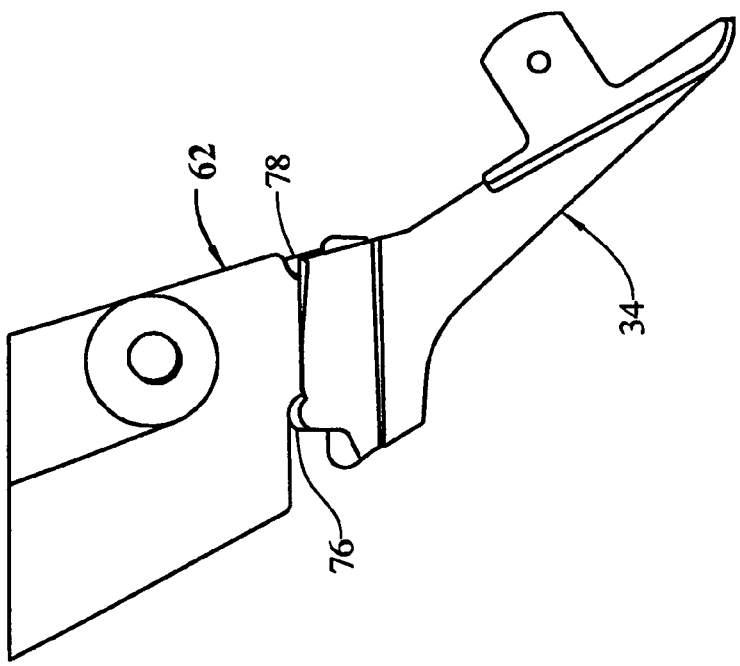
FIG. 5 is a fragmentary, exploded left side view of the seed tube guard shown in FIG. 2, shown in a pre-installation condition.

FIGS. 2 and 3 illustrate the seed tube guard 34 of the invention. The seed tube guard 34 is supported by a mount or frame member 62 that is supported between discs 22a, 22b of the double disc opener 22, via an axle 64.

FIG. 4 illustrates the guard 34 mounted to the frame member 62. The frame member 62 includes a mounting pin 68 carried by a neck 70. The pin 68 and neck 70 can be formed unitary with the remaining portions of the frame member 62. According to the preferred embodiment, the frame member 62 is a single, ductile iron piece.

The guard 34 includes an attachment yoke 74. The attachment yoke 74 can be formed unitary with remaining portions of the guard 34. The yoke 74 includes a front journal 76 and a rear journal 78. The rear journal 78 includes a gap 80 that is slightly wider than the neck 70 of the frame 64 but is located at an angle to the vertical.

Figure 6:
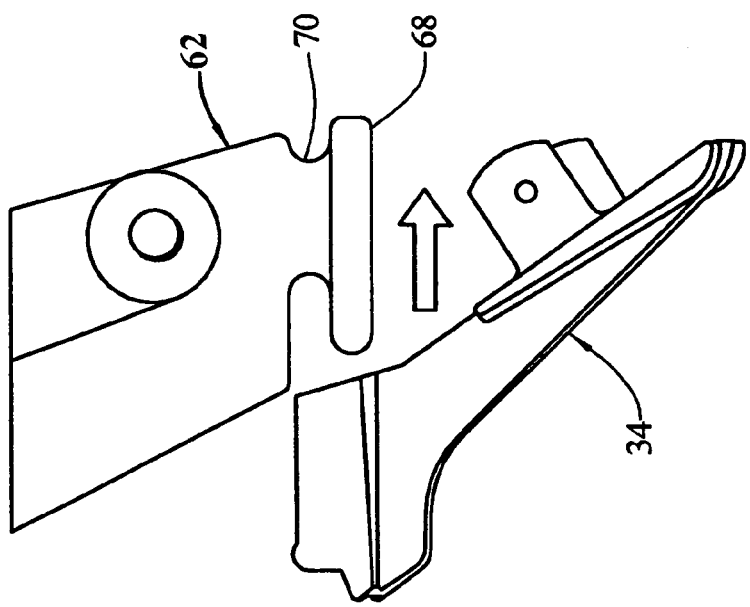
FIG. 6 is a fragmentary, left side view of the seed tube guard shown in FIG. 2, shown in a fully installed and locked condition.

FIGS. 5 through 8 illustrate the engagement of the frame member 64 with the guard 34. The guard 34 is tilted (FIG. 7) and longitudinally slid (FIG. 5) onto the pin 68, with the neck 70 passing through the gap 80 and sliding rearward until the neck contacts the front journal 76 (FIG. 6). The guard 34 is then pivoted to return to the vertical position (FIG. 8) wherein the neck 70 is no longer in registry with the gap 80.

During operation, the guard 34 can pivot or laterally float from between the two angles "a", "b" to the vertical "V" as shown in FIG. 9. To show the limits of the swing movement two guards 34 are shown in FIG. 9, with the understanding that only one guard 34 would actually be present between the discs 22a, 22b as shown in FIG. 3. Because of the close proximity of the discs 22a, 22b, the guard 34 cannot be pivoted sufficiently to register the gap 80 with the neck 70. Thus, the guard cannot be removed from the frame member 64 without removing one of the discs 22a, 22b.

The guard of the present invention is advantageously a single piece and fits into mutual engagement with the mount or frame member. No fasteners, separate fastener parts, or tools are needed to assemble the guards onto the seed planter. A reduction in assembly time and equipment cost is achieved by the present invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. In combination, a seed tube guard for leading a seed tube through a furrow, and a frame member mountable to a seed planting machine, said seed tube guard comprising a body for fronting a seed tube, a first connection configuration formed in unitary fashion with said body for mounting said guard to said frame member, and said frame member comprising a second connection configuration, said first and second connection configurations mutually engagable together without the use of tools, or a fastener, by relative sliding movement of said guard with respect to said frame member.

2. The combination according to claim 1, wherein said guard is composed of steel and said frame member is composed of iron.

3. The combination according to claim 1, wherein one of said first and second connection configurations comprises a yoke comprising a front journal and a rear journal, said front journal comprising a first circular opening, and said rear journal comprising a second circular opening with a gap, said gap being angled to said vertical, and said respective other of said first and second connection configurations comprising a pin connected by a neck, said pin sized to fit between and into said first and second circular openings, said neck having a thickness less than a width of said gap, and a length to fit between said front and rear journals.

4. The combination according to claim 3, wherein said first connection configuration comprises said yoke and said second connection configuration comprises said pin and said neck.

5. The combination according to claim 3, wherein said angle of said gap is set to be greater than a free lateral swinging movement of said guard, said free swinging movement limited by interference with structures of said seed planting machine.

6. In combination, a seed tube guard for leading a seed tube through a furrow, and a frame member mountable to a seed planting machine, said seed tube guard comprising a body for fronting a seed tube, a first connection configuration for mounting said guard to said frame member, and said frame member comprising a second connection configuration, said first and second connection configurations mutually engagable together; and wherein one of said first and second connection configurations comprises a yoke comprising a front journal and a rear journal, said front journal comprising a first circular opening, and said rear journal comprising a second circular opening with a gap, said gap being angled to said vertical, and said respective other of said first and second connection configurations comprising a pin connected by a neck, said pin sized to fit between and into said first and second circular openings, said neck having a thickness less than a width of said gap, and a length to fit between said front and rear journals.

7. The combination according to claim 6, wherein said first connection configuration comprises said yoke and said second connection configuration comprises said pin and said neck.

8. The combination according to claim 6, wherein said angle of said gap is set to be greater than a free lateral swinging movement of said guard, said free swinging movement limited by interference with structures of said seed planting machine.

9. In combination, a seed tube guard for leading a seed tube through a furrow, and a frame member mountable to a seed planting machine, said seed tube guard comprising a body for fronting a seed tube, a first connection configuration fixed to said body for mounting said guard to said frame member, and said frame member comprising a second connection configuration, said first and second connection configurations being hand-engageable together, without the use of a fastener, by an interlocking connection engaged by relative sliding and rotary movement of said guard with respect to said frame member.

10. The combination according to claim 9, wherein said guard is composed of steel and said frame member is composed of iron.

11. The combination according to claim 9, wherein one of said first and second connection configurations comprises a yoke comprising a front journal and a rear journal, said front journal comprising a first circular opening, and said rear journal comprising a second circular opening with a gap, said gap being angled to said vertical, and said respective other of said first and second connection configurations comprising a pin connected by a neck, said pin sized to fit between and into said first and second circular openings, said neck having a thickness less than a width of said gap, and a length to fit between said front and rear journals.

12. The combination according to claim 11, wherein said first connection configuration comprises said yoke and said second connection configuration comprises said pin and said neck.

13. The combination according to claim 11, wherein said angle of said gap is set to be greater than a free lateral swinging movement of said guard, said free swinging movement limited by interference with structures of said seed planting machine.

14. The combination according to claim 9, wherein said first and second connection configurations are engageable first by a relative sliding motion therebetween and second by a pivoting motion therebetween.

15. The combination according to claim 14, wherein said pivoting motion is prevented from reversing by laterally arranged structure of the seed planting machine.

16. In combination, a seed tube guard for leading a seed tube through a furrow, and a frame member mountable to a seed planting machine, said seed tube guard comprising a body for fronting a seed tube, a first connection configuration for mounting said guard to said frame member, and said frame member comprising a second connection configuration, said first and second connection configurations being hand-engageable together by an interlocking connection; and wherein one of said first and second connection configurations comprises a yoke comprising a front journal and a rear journal, said front journal comprising a first circular opening, and said rear journal comprising a second circular opening with a gap, said gap being angled to said vertical, and said respective other of said first and second connection configurations comprising a pin connected by a neck, said pin sized to fit between and into said first and second circular openings, said neck having a thickness less than a width of said gap, and a length to fit between said front and rear journals.

17. The combination according to claim 16, wherein said first connection configuration comprises said yoke and said second connection configuration comprises said pin and said neck.

18. The combination according to claim 16, wherein said angle of said gap is set to be greater than a free lateral swinging movement of said guard, said free swinging movement limited by interference with structures of said seed planting machine.

19. In combination, a seed tube guard for leading a seed tube through a furrow, and a frame member mountable to a seed planting machine, said seed tube guard comprising a body for fronting a seed tube, a first connection configuration for mounting said guard to said frame member, and said frame member comprising a second connection configuration, said first and second connection configurations being hand-engageable together by an interlocking connection; and wherein said first and second connection configurations are engageable first by a relative sliding motion therebetween and second by a pivoting motion therebetween.

20. The combination according to claim 19, wherein said pivoting motion is prevented from reversing by laterally arranged structure of the seed planting machine.

* * * * *